(12) United States Patent
Bonsma

(10) Patent No.: US 7,787,395 B2
(45) Date of Patent: Aug. 31, 2010

(54) VIRTUAL NETWORKS

(75) Inventor: Erwin R Bonsma, Suffolk (GB)

(73) Assignee: British Telecommunications plc, London (GB)

( * ) Notice: Subject to any disclaimer, the term of this patent is extended or adjusted under 35 U.S.C. 154(b) by 1233 days.

(21) Appl. No.: 10/558,882

(22) PCT Filed: Sep. 17, 2004

(86) PCT No.: PCT/GB2004/004003

§ 371 (c)(1),
(2), (4) Date: Dec. 1, 2005

(87) PCT Pub. No.: WO2005/032069

PCT Pub. Date: Apr. 7, 2005

(65) Prior Publication Data

US 2006/0280172 A1 Dec. 14, 2006

(30) Foreign Application Priority Data

Sep. 25, 2003 (GB) ................................ 0322491.2

(51) Int. Cl.
  *H04L 12/28* (2006.01)
  *H04L 12/50* (2006.01)
  *H04Q 11/00* (2006.01)
  *G06F 15/177* (2006.01)
(52) U.S. Cl. ........................ 370/254; 370/351; 370/379; 370/400; 709/220; 709/221
(58) Field of Classification Search ......... 370/216–218, 370/229, 242, 245, 254, 351, 352, 379, 401; 709/220–221
See application file for complete search history.

(56) References Cited

U.S. PATENT DOCUMENTS 5,317,757 A * 5/1994 Medicke et al. ............. 712/229
6,115,394 A * 9/2000 Balachandran et al. ...... 370/477

(Continued)

FOREIGN PATENT DOCUMENTS

| EP | 1134940 A1 | 9/2001 |
| EP | 1176780 A1 * | 1/2002 |
| EP | 1 202 490 A2 | 5/2002 |
| WO | WO 97/08838 A2 * | 3/1997 |
| WO | 01/41380 A3 | 6/2001 |

OTHER PUBLICATIONS

Stoica et al. "Chord: A Scalable Peer-to-Peer Lookup Service for Internet Applications"—Aug. 2001.*
Zhao et al. "Tapestry: An Infrastructure for Fault Tolerant Wide-Area Location and Routing"—Apr. 2001.*
Ratnasamy et al. (A Scalable Content-Addressable Network—Aug. 2001).*

(Continued)

*Primary Examiner*—Jayanti K Patel
*Assistant Examiner*—Christopher T Wyllie
(74) *Attorney, Agent, or Firm*—Nixon & Vanderhye PC

(57) ABSTRACT

Each node of a virtual network can store only a predetermined number of address links to other nodes. In response to receiving a link request between a first node and a second node, it is determined whether both the first and second nodes have less than the predetermined numbering their lists. If this condition is satisfied, the address of the first node is inserted into the second node's list and the address of the second node is inserted into the first node's list. If this condition is not satisfied, it is determined whether the first node list has at least two less than the predetermined number and, if so, then the link between the second and third nodes is broken and they are instead newly linked to the first node.

9 Claims, 14 Drawing Sheets

U.S. PATENT DOCUMENTS

| | | | |
|---|---|---|---|
| 6,266,322 B1 * | 7/2001 | Berger et al. | 370/229 |
| 6,757,242 B1 * | 6/2004 | Wang et al. | 370/216 |
| 6,856,627 B2 * | 2/2005 | Saleh et al. | 370/397 |
| 6,944,681 B1 * | 9/2005 | Christensen et al. | 710/8 |
| 6,987,762 B2 * | 1/2006 | Shiota | 370/389 |
| 7,069,495 B2 * | 6/2006 | Soderberg et al. | 714/776 |
| 7,181,214 B1 * | 2/2007 | White | 455/435.1 |
| 7,184,421 B1 * | 2/2007 | Liu et al. | 370/338 |
| 7,356,628 B2 * | 4/2008 | Swartzentruber | 710/104 |
| 7,360,083 B1 * | 4/2008 | Ragireddy et al. | 713/160 |
| 7,386,881 B2 * | 6/2008 | Swander et al. | 726/14 |
| 7,400,627 B2 * | 7/2008 | Wu et al. | 370/392 |
| 7,430,617 B2 * | 9/2008 | Walsh et al. | 709/247 |
| 7,453,907 B2 * | 11/2008 | Jonsson et al. | 370/477 |
| 7,599,341 B2 * | 10/2009 | Ramachandran | 370/338 |
| 7,657,597 B2 * | 2/2010 | Arora et al. | 709/206 |
| 2002/0073227 A1 * | 6/2002 | Bunn et al. | 709/236 |
| 2002/0082035 A1 * | 6/2002 | Aihara et al. | 455/518 |
| 2002/0107982 A1 | 8/2002 | Bjorner et al. | |
| 2002/0145978 A1 | 10/2002 | Batsell | |
| 2002/0163889 A1 * | 11/2002 | Yemini et al. | 370/238 |
| 2003/0053450 A1 * | 3/2003 | Kubota et al. | 370/356 |
| 2003/0065812 A1 * | 4/2003 | Beier et al. | 709/236 |
| 2003/0076838 A1 * | 4/2003 | Shaio et al. | 370/395.5 |
| 2003/0131044 A1 | 7/2003 | Yu et al. | |
| 2003/0202468 A1 * | 10/2003 | Cain et al. | 370/229 |
| 2004/0022224 A1 * | 2/2004 | Billhartz | 370/338 |
| 2004/0042434 A1 * | 3/2004 | Kennedy | 370/338 |
| 2004/0064512 A1 * | 4/2004 | Arora et al. | 709/206 |
| 2004/0136476 A1 * | 7/2004 | Rosen et al. | 375/340 |
| 2004/0202167 A1 * | 10/2004 | Jonsson et al. | 370/392 |
| 2004/0213167 A1 * | 10/2004 | Garcia-Luna-Aceves et al. | 370/254 |
| 2004/0221312 A1 * | 11/2004 | Kobayashi | 725/105 |
| 2004/0223465 A1 * | 11/2004 | Lee et al. | 370/313 |
| 2004/0246911 A1 * | 12/2004 | Bonsma et al. | 370/254 |
| 2004/0249973 A1 * | 12/2004 | Alkhatib et al. | 709/245 |
| 2005/0063319 A1 * | 3/2005 | Kyperountas et al. | 370/254 |
| 2005/0281259 A1 * | 12/2005 | Mitchell | 370/389 |
| 2006/0034209 A1 * | 2/2006 | O'Neill | 370/328 |
| 2006/0155827 A1 * | 7/2006 | Prehofer et al. | 709/220 |
| 2006/0259640 A1 * | 11/2006 | Bonsma | 709/245 |
| 2006/0285543 A1 * | 12/2006 | Bonsma et al. | 370/397 |
| 2007/0140145 A1 * | 6/2007 | Kumar et al. | 370/254 |
| 2008/0159299 A1 * | 7/2008 | Bu et al. | 370/400 |
| 2009/0282132 A1 * | 11/2009 | Pappas et al. | 709/221 |

OTHER PUBLICATIONS

Ratnasamy et al. (A Scalable Content-Addressable Network—Aug. 2001).*

PCT International Search Report dated Nov. 16, 2004.

PCT International Search Report dated Dec. 7, 2004.

UK Search Report dated Dec. 9, 2003.

Rowstron, Antony; Pastry: Scalable, decentralized object location and routing for large-scale peer-to-peer systems; Nov. 2001; IFIP/ACM International Conference on Distributed Systems Platforms (Middleware), Heidelberg, DE, pp. 329-350.

Ratnasamy, Sylvia, A Scalable Content-Addressable Network; Aug. 27-31, 2001; ACM, USA—Computer Communication Review; Communication Review {Comput-Commun-Rev-USA}, Oct. 2001, vol. 31, No. 4, p. 161-172.

Clarke, Ian; Freenet: A Distributed Anonymous Information Storage and Retrieval System; Jul. 1, 2000, Springer-Verlag, Designing Privacy Enhancing Technologies. International Workshop on Design Issues in Anonymity and Unobservability. Proceedings (Lecture Notes in Computer Science, vol. 2009), 2001, p. 1-17.

Kwon, Gisik, An Efficient Peer-to-Peer File Sharing Exploiting Hierarchy and Asymmetry; Jan. 27-31, 2003; IEEE Comput. Soc., Proceedings 2003 Symposium on Applications and the Internet, 2003, p. 226-233.

* cited by examiner

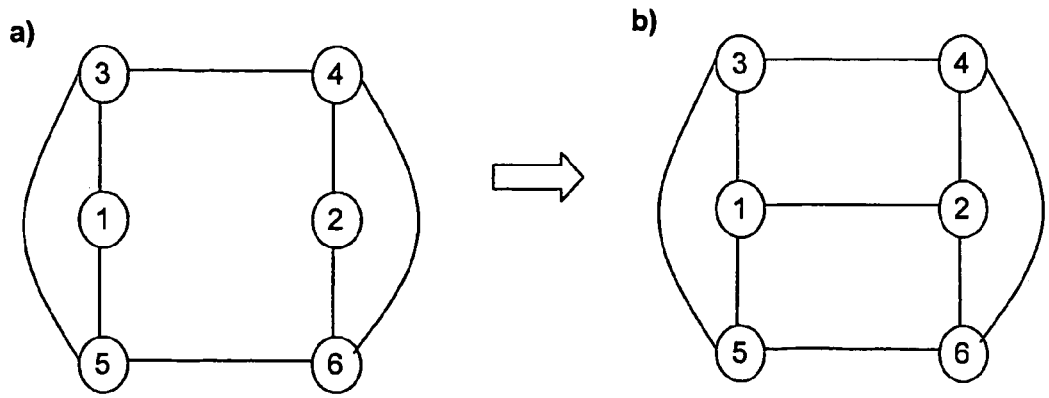

How a new link is created between two nodes (Node 1 and 2) when both nodes can still create a new link. a) The network before Node 1 received a Notify message about Node 2, and b) The network after Node 1 successfully created a new link in response to the Notify message.

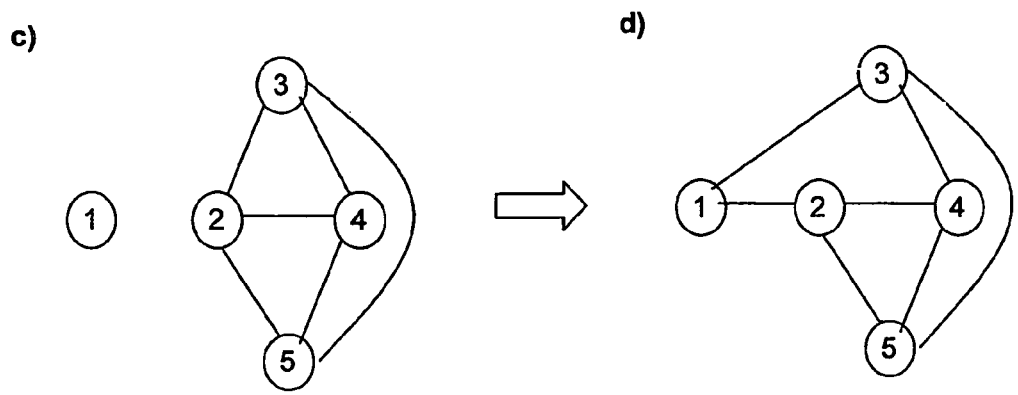

How a node (Node 1) inserts itself in an existing link (between Node 2 and Node 3) because Node 2 already had the maximum number of links. c) The network before Node 1 received a Notify message about Node 2, and d) The network after Node 1 successfully changed an existing link into two new ones in response to the Notify message.

VIRTUAL NETWORKS

This application is the US national phase of international application PCT/GB2004/004003 filed 17 Sep. 2004 which designated the U.S. and claims benefit of GB 0322491.2, dated 25 Sep. 2003, the entire content of which is hereby incorporated by reference.

BACKGROUND

Technical Field

The present invention relates to virtual networks, and particularly, though not exclusively in the context of distributed systems such as peer-to-peer systems, especially those with no centralised storage or control.

SUMMARY

According to one aspect of the present invention there is provided a method of operating a virtual network having a plurality of nodes, in which each node has a list for storing up to a predetermined number of addresses of other such nodes, comprising:

(i) receiving a message requesting a link between a first node and a second node;
(ii) determining whether both the first node and second node has in each case a number of addresses in its list which is less than the predetermined number;
(iii) in the event that this condition is satisfied, inserting the address of the first node into the list of the second node and inserting the address of the second node into the list of the first node
(iv) in the event that this condition is not satisfied, determining whether the first node has a number of addresses in its list which is at least two less than the predetermined number, and if so—
  (a) selecting from the list of the second node the address of a third node;
  (b) removing the address of the third node from the list of the second node;
  (c) removing the address of the second node from the list of the third node;
  (d) inserting the address of the second node into the list of the first node and inserting the address of the third node into the list of the first node; and
  (e) inserting the address of the first node into the list of the second node and inserting the address of the first node into the list of the third node.

In another aspect, the invention provides a node of a virtual network, said node being defined by storage means containing a list for storing up to a predetermined number of addresses of other such nodes and processing means programmed to perform the following operations:
receiving messages;
responding to messages requesting information about the contents of the list;
complying with received requests to remove an address from the list;
complying with message requesting insertion of an address into the list; and
in response to receipt of a message requesting a link between the node and a second node:
(A) generating a message to the second node requesting information about the contents of its list;
(B) determining whether both the first node and second node has in each case a number of addresses in its list which is less than the predetermined number;
(C) in the event that this condition is satisfied, inserting into its list the address of the second node and generating a message to the second node requesting the second node to add to its list the address of the node;
(D) in the event that this condition is not satisfied, determining whether the node has a number of addresses in its list which is at least two less than the predetermined number, and if so—
  (a) selecting from the list of the second node the address of a third node;
  (b) inserting the address of the second node into the list of the first node and inserting the address of the third node into the list of the first node;
  (c) generating a message to the second node requesting the removal of the address of the third node from the list of the second node and insertion of the address of the node; and
  (d) generating a message to the third node requesting the removal of the address of the second node from the list of the third node and insertion of the address of the node.

Other, preferred, aspects of the invention are defined in the claims.

BRIEF DESCRIPTION OF THE DRAWINGS

Some embodiments of the invention will now be described, by way of example, with reference to the accompanying drawings, in which:

FIG. 2 is a schematic diagram illustration the management of links between nodes of a computer network;

DETAILED DESCRIPTION OF EXEMPLARY EMBODIMENTS

Nodes

In this description reference will be made to computing nodes that have processing, storage and communication capabilities. A computing node can be a computer or other device, or—noting that a single computer may have a number of independent programs or processes running on it—may be a such a program or process. An item of stored data may also be regarded as a distinct node, even though a number of such items may be serviced by a single program or process.

This description assumes that each computing node is connected to some communication infrastructure which could for example be a telecommunications network such as an IP (internet protocol) network, so that messages can be sent to it. Thus, each computing node also constitutes a node within the communications infrastructure.

Reference will also be made to virtual nodes which belong to a virtual network. The distinction is important because a computing node is able to have two or more virtual nodes (possibly belonging to different virtual networks) associated with it. As its name implies, a virtual node does not exist in any physical sense: rather, as will become clear presently, its existence is established by stored data which define links between virtual nodes and, hence, also define the virtual network to which it belongs.

Necessarily a virtual node must be associated with a computing node, which provides it with processing, storage and communication capabilities: references to the sending, receiving and processing of messages by a virtual node refer to such sending receiving or processing by the computing node on behalf of the virtual node.

Figure 1:
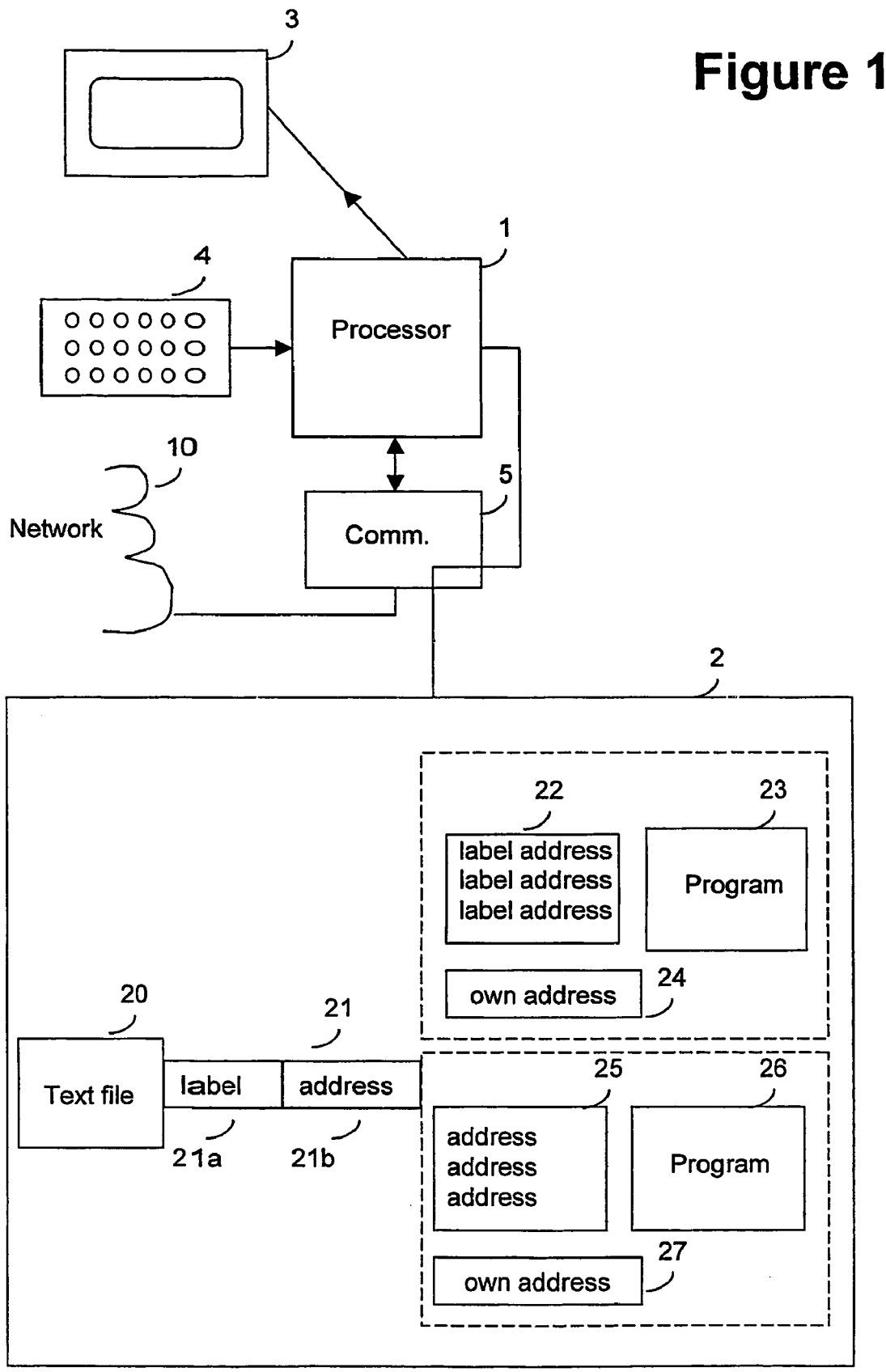
FIG. 1 is a block diagram of a computer used in one embodiment of the invention.

An example is shown in FIG. 1. A computer has the usual components, namely a processor 1, memory 2, display 3, keyboard 4 and a communications interface 5 for communication via a network 10.

The memory 2 contains operating system and other programs (not shown), and data files such as the text file 20 shown. It also has storage 21 containing a label 21a corresponding to the text file 20 and its own address 21b. In addition, it has an address list 22 and a supporting program 23 which together define the existence, on the computer, of a node of a virtual network. This node has an address 24. Also shown are an address list 25 and a supporting program 26 which together define the existence, on the computer, of a node of another virtual network. This node has an address 27. The addresses stored in the lists 22, 25 are the addresses of other nodes in the same virtual network.

Look-Up System

We will now describe a distributed look-up system, though this is only one possible example of an application for the invention. This system allows users to associate comments with a web page. Whenever a user visits this page, he has the opportunity also to view the comments that other users have made. The comment is stored on the computer of the user that contributed the comment (e.g. as a text file).

The user viewing the web page (or rather, his computer) has the universal resource locator (URL) of the web page, and what is required is a mechanism whereby he can retrieve the comments. In this example the mechanism is as follows:

The text file is stored on the computer of the user that contributed the comment and is associated with a node of a virtual network of the type described in our international patent application no. WO 03/034669 [Agent's ref. A30044], as too may be other text files containing comments about other web pages, and possibly other unrelated files too. This virtual network (referred to in the context of the present description as the primary virtual network, or simply the primary network) serves to allow one to send a message to a node without knowing its address provided one has a label which identifies it. Although that type of network can function with unique labels (one per node), in this example the labels are not unique: rather, all nodes associated with text files containing comments about a particular web page have the same label. This label is a hash function of the URL of the web page. This virtual network offers a retrieval mechanism which reaches only one node.

The text file is also associated with a node of a second virtual network. This (the secondary virtual network) contains only nodes associated with text files containing comments about the one particular web page.

Note however that whilst the use of a primary network in accordance with our aforementioned international patent application is preferred, it is not essential. Indeed, it is not essential to use a virtual network at all; another primary retrieval mechanism which receives a label and returns the address of one node corresponding to it could be used instead.

The computer posting a comment is as shown in FIG. 1 and must
 create a node in the primary network. This node has a label 21a and a network address 24.
 create a node in the secondary network. This node has a network address 27.

Initially the address lists 22, 25 are empty, except that the list 22 contains bootstrap links. The self-organisation of the networks to ensure that the list 22 contains the labels and addresses of some other nodes of the primary network and that the list 25 contains the addresses of some other nodes of the secondary network will be described later. For the time being, the system will be described on the assumption that these labels and addresses are present.

A few words about addresses are in order at this point. The node formed by the text file 20, the node of the primary virtual network and the node of the secondary virtual network, whilst conceptually having a single identity, have their own addresses. It would be possible to allocate to each node a distinct address within the communications network 10, although in practice this is not particularly convenient. In our preferred implementation each node has an address consisting of three parts:
 An internet address, which "locates" the computing node. E.g. 130.146.209.15
 A port number, which locates a particular communication port at the computing node. Ports are a standard part of Internet addresses. They for instance allow different independent application programs to independently send and receive messages. I.e. each would receive messages at its own port, and would not receive or be "confused" by messages intended for other application programs. The Internet address together with the port number can be considered to be the network address (as it is part of the communication protocols, such as TCP/IP, that are used). The network address for all primary and secondary nodes can be the same, however, not necessarily so. For instance, all messages for primary nodes may be received at a different port from that at which secondary messages are received (which is one way to distinguish between such messages).
 A node identifier (an integer value), which locates the specific node for which the message is intended. e.g. if all messages on the primary network are received at a dedicated port, there is still a locally unique identifier associated with each node. So, when there are multiple nodes, it is clear for which node the message is intended. This node identifier is an application-specific address extension (it's not part of the standard Internet protocol). It is simply included in the message that is sent. The process that receives it "knows" this and will examine this node identifier to determine to which node the message should be forwarded.

It is possible that both nodes have the same network address, but not necessarily so. Not every node will have a port of its own (partly because the number of available ports is somewhat limited), but one may well have two ports (and thus two different network addresses): one for the primary network and one for the secondary network. Typically, there will be a number of secondary networks, which could all use the same port.

It should be stressed that, in the following, references to the address of a node refer to the complete address of that node.

A particularly attractive approach is to provide that a text file and the primary and secondary nodes all have the same node identifier (and IP address), only the port numbers being different. Such an addressing protocol may provide an opportunity for simplifying some of the processing in that, where one has the address of one node and requires the address of another node associated with it, the address of the latter node might be deduced from that of the former, rather than have to be looked up. In the following description, however, no such simplification has been made, so that these processes will work with any address protocol.

The computer viewing a web page retrieves the associated comments by applying the same hash function to the URL to obtain the label sending a query (containing the label) on the primary virtual network, to obtain the address of one node using the address found, sending a query on the second virtual network to obtain the addresses of more (or even all) all other nodes on the second virtual network.

using these addresses to retrieve the comments for display.

Figure 1A:
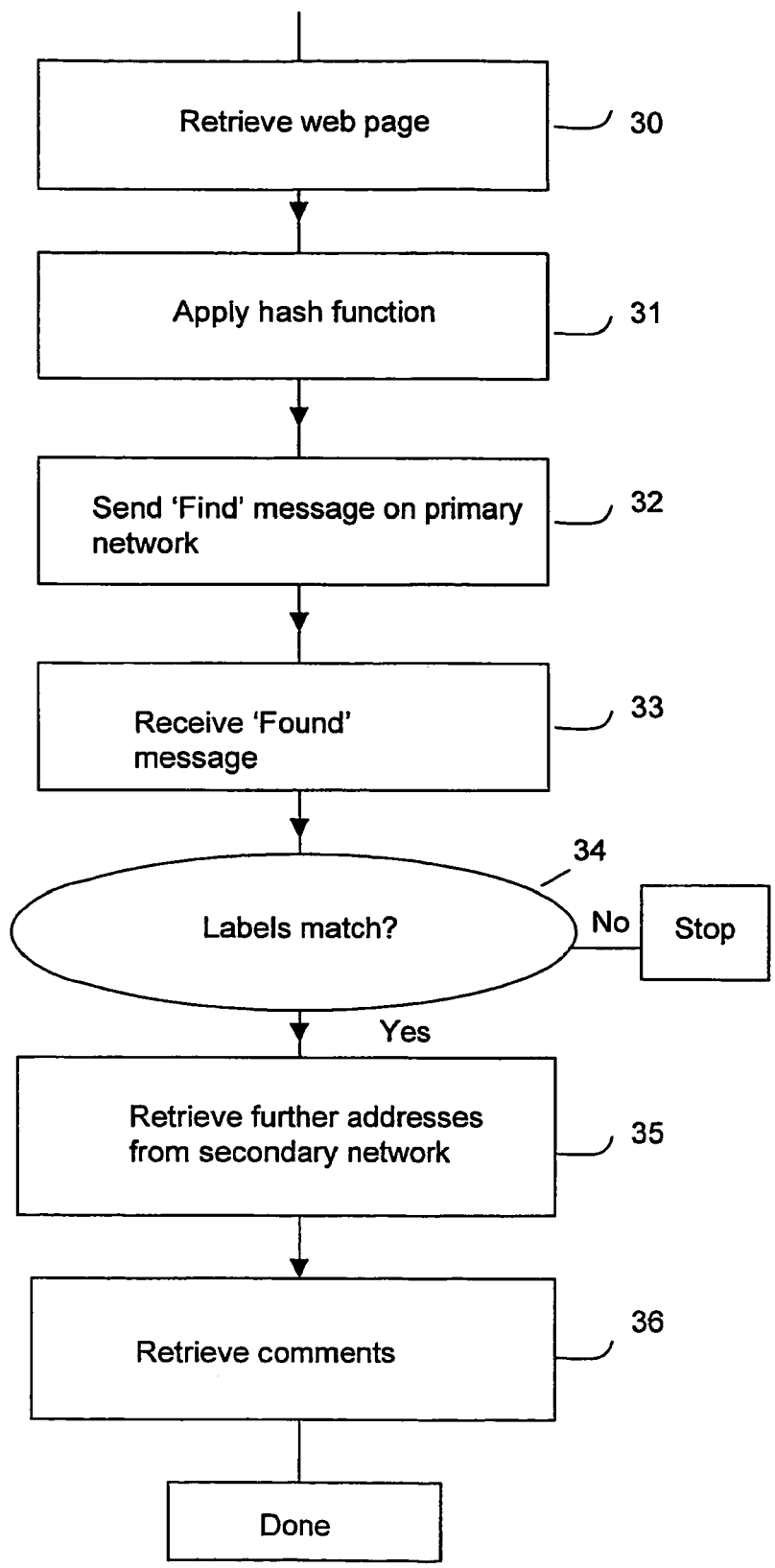
FIG. 1A is a flowchart showing a data retrieval operation using primary and secondary virtual networks.

Note that the retrieving computer does not necessarily have to contain nodes of the virtual networks; it can be a conventional computer loaded with software for implementing the retrieval process, and with a communication interface so that it can communicate with the computers on which the nodes of the virtual networks reside. This process is shown in the flowchart of FIG. 1A, and proceeds as follows:

Step 30: following the user inputting a URL (or invoking a hyperlink) the computer retrieves the corresponding web page. This step is entirely conventional.

Step 31: a hash function is applied to the URL to obtain a label. As discussed in our earlier international patent application, this could use the SHA-1 algorithm.

Step 32: a 'Find' message, containing this label and the network address of the retrieving computer, is sent to a node of the primary network. Manifestly it is necessary for the computer to be in possession of at least one such address.

Step 33: the retrieving computer receives a 'Found' message from the primary network. This message contains the label and address of a node that has been found as well as the addresses of the associated node of the secondary network, and of the comment A timeout mechanism could be included to abort the process if a Found message is not received in a reasonable time.

Step 34: in this example, the primary network is arranged so that it always returns the label and address of the node having a label closest to the label contained in the Find message. So a check is performed to see if the label that is returned is the same as that asked for, and if not, the process is terminated. See below for an explanation of the meaning of "nearest".

Step 35: assuming that the labels match, the retrieving computer executes a process (to be described in detail below) whereby it uses the address returned by the Found message to retrieve further addresses using the secondary network.

Step 36: These addresses are then uses to retrieve from the "posting" computers the text files containing the comments.

The Secondary Virtual Network

The aim of this network is to self-organise a group of nodes into a single virtual network, which can subsequently be used to discover all nodes that are part of the group. The main requirement is that the resulting network contains all nodes. Another requirement is that the system load that is needed to create and maintain the network is spread equally across all nodes. Not only is this the most "fair", which is important when different users contribute their resources to a distributed application, it also helps to protect the system against overload.

The network, therefore, has the following properties:

The number of links maintained by each node is preferably the same.

All links are bi-directional. As a result, the number of links to a node are also the same for each node. This is important, as this affects the number of a messages that a node receives and must handle.

It has a "flat" structure. The nodes do not arrange themselves hierarchically. As a result, the system load is spread equally across all nodes.

Structure of Each Node

Each node has the following data associated with it:

Several links to other nodes. Each link is simply the address of another node. Associated with each link is a status, which can be "confirmed" or "unconfirmed". Each node can only maintain a maximum number of links, which is given by the system wide parameter L. A typical value for L is for instance 6. It is not essential that this parameter be the same for all nodes; but there is no advantage to be gained by making them different.

A list of spare links, or spares in short. Each spare is simply the address of another node. The spares are used by the self-organisation process to build the virtual network. A node adds other nodes as spares when it is notified about a node that it cannot add as a link, either because it already links to the node, or because it has the maximum number of links already. The number of spares that a node can maintain is also limited, and given by the system wide parameter S. A typical value for S is for instance 3. The list of spare links is not essential in general, but is very valuable in providing an additional mechanism whereby a link that cannot be accommodated locally can be propagated to some other point in the virtual network. However the use of spare links (or a similar propagation mechanism) is necessary in systems where the incoming Notify messages always arrive at the same node (or one of a very small number of nodes) of the secondary network.

Messages

In order to self-organise into a network and to discover which nodes are part of a given network, nodes send messages to one another: The following types of messages are used by the secondary network:

AddLink message with:

address of sender address of receiver

It is sent by a node (sender) to another node (receiver) to request a mutual link.

ChangeLink message with:

address of sender address of receiver address of subject

It is sent by a node (X) to another node (Y) to request that it changes one of its links (Z) to a link to itself (X). The protocol is such that X will send a similar message to Z requesting it to change its link to Y with a link to itself (X). So, effectively, X requests to insert itself in the link currently between Y and Z.

LinkAdded message with:

address of sender address of receiver

It is used to notify a node that the sender just added a link to it.

LinkError message with:

address of sender address of receiver address of subject
error code
It is used to notify a node that there appears to be a problem with one of its links. For instance, the subject node may not respond, or the link may not be mutual. It includes an error code to indicate the type of error.

Links message with:
address of sender
address of receiver
addresses of all links
reference value
the Links message can also contain some other data from the sender node. In the web page comment example this is the address of the associated comment It contains all the current links of the sending node. It is always sent in response to a LinksQuery message. The reference can be used to distinguish the specific query that is responded to.

LinksQuery message with:
address of sender
address of receiver
reference value
It is used to request a node to send a Links message in reply (containing its current links).

Notify message with:
address of sender
address of receiver
address of subject
notify level
It is used to notify a node of another node in the network. The notify level is used to control and limit the propagation of Notify messages. As described here, sender address is not used, but is useful for debugging or if it is desired to send acknowledgements.

Building the Secondary Network

The system lets a group nodes self-organise into a single, virtual network, so that if one has the address of one node one can find the addresses of others in the group. This section describes how new links are created when nodes that should belong to the same secondary network are discovered. Two parts can be distinguished here:

Discovery of pairs of nodes that should belong in the same secondary network. What the criterion is for grouping nodes into the same network is application specific. In the web page annotation example, all nodes that represent comments about the same URL should be grouped together in a secondary network. How nodes are discovered that should be grouped together is also application-specific. An example is given shortly.

Updating/extending the secondary network as a result of node discovery. When a pair of nodes is discovered that should belong to the same secondary network, the system may build one or more new links as a result. The new link is not necessarily between the pair of nodes, but may for instance be between nodes that these two nodes link to. How new links are created is described in detail later.

Initial Notify Message

The organisation of the secondary network presupposes the existence of incoming 'Notify' messages that may for example identify an existing and a new member of the group (although early on, it is possible that neither node is yet part of the group, whilst, later in the self-organisation process, both nodes might already be part of the group). It is up to another part of the system to notify the secondary network of nodes that should belong to it. There are different ways in which it can be done. Here we give an example of how this is done when the secondary network is used in combination with a primary network of the type described in our earlier international patent application. In the web page annotation example, each comment publishes itself as a node in the primary network under a label based on the URL of the corresponding web page. This way, the primary network can be used to look-up a comment for a given URL, if one exists. In order to show all comments for a given URL, each comment also has a node of the secondary network associated with it. Nodes that correspond to comments about the same URL self-organise into a secondary network specific to that URL. This way, once the primary network is used to find a single comment about a URL, the secondary network can be used to find other comments about the same URL.

So in this case, nodes of the secondary network that should be grouped together are each published under the same label in the primary network. A mechanism whereby in the primary network, nodes periodically execute a 'Push' update to build and maintain links will be described below, including a modification so that whenever a node becomes aware of another node published under the same label, the needed Notify message is generated.

Handling Notify Messages

When a node receives a Notify message about a node that it does not yet link to, one of the following will happen:

If the receiving node already has the maximum number of allowed links, it adds it as a spare instead (unless it already had it as a spare). If in doing so, the node would exceed its maximum number of spares, it removes one spare. It may then also forward the Notify message to the spare it removed. Whether or not it does so depends on the value of the notify level. The notify level is decreased each time to prevent messages from propagating endlessly.

Otherwise, if the subject node does not yet have the maximum number of links either, the receiving node attempts to create a mutual link between both nodes. This is illustrated in FIG. 2, diagrams a and b. Here, L=3 and Node 1 has received a Notify message about Node 2. Because both nodes only had two links, a link is created between Node 1 and Node 2.

Otherwise, when the subject node already has the maximum number of links, it is not possible to simply create a mutual link between both nodes. So what happens is that receiving node attempts to insert itself in an existing link. This is illustrated in FIG. 2, diagrams c and d. Here, the link between Node 2 and Node 3 is broken, but it is replaced by two new links: a link between Node 1 and Node 2 and a link between Node 1 and Node 3. So the total number of links is increased by one. It works even though Node 2 and Node 3 already had the maximum number of links. However, Node 1 needed to be able to create two new links for this to succeed. The process is explained in more detail in the flowcharts of FIG. 3 to FIG. 9.

Figure 3:
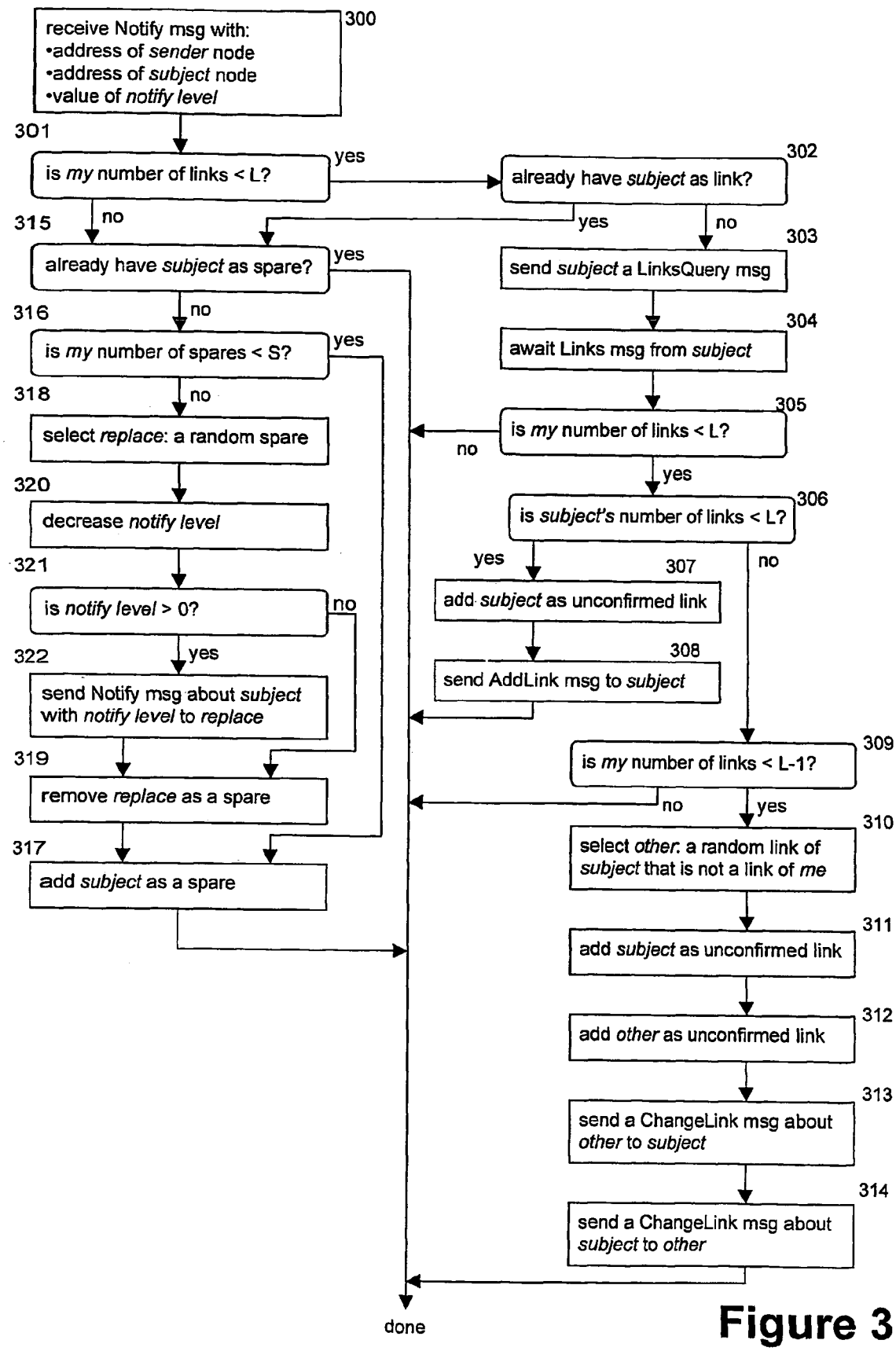
FIGS. 3 to 10 are flowcharts showing aspects of the operation of a node of the secondary virtual network.

FIG. 3 shows how a node handles incoming Notify messages. Here it is decided whether a new link should be created, and if so how (by adding a new link or by changing an existing link into two links). If no new links are created, the set of spares may be updated and another Notify message may be sent.

At Step 300, a Notify message is received, containing the address of the node that sent it (sender), the address of the subject node, and a propagation limit value, notifylevel. The receiving node firstly checks (301) whether it has space to set up a new link and if so, whether (302) it already has a link to the subject node. If not, it attempts to set up a link with subject.

In Step 303 it sends a LinksQuery message to the subject node, and at 304, awaits a reply. Once the reply—a Links message—is received, it again checks (305) whether it still has space to set up a new link (in case it has received and handled any other messages in the meantime and created links as a result). If so, it then (306) examines the received Links message to check whether the subject node has the space to set up a new link. If it has then at Step 307 and 308 the receiving node adds the address of the subject node to its list of links (but marked "unconfirmed") and sends an AddLink message to the subject node.

If however at Step 306 it is determined that the subject node cannot accept further links, the receiving node then attempts to insert itself into an existing link as mentioned earlier with reference to FIG. 2. The first step (309) is to check whether the receiving node has space for two links; if not, the process is terminated. If however it has, then the receiving node selects a link at random from the list of links in the received Links message (but not a node to which the receiving node already has a link), that is, a link between the subject node and another node referred to here as other. The receiving node then attempts to insert itself into this link by:

311 adding the address of the subject node (unconfirmed) to its list of links;
312 adding the address of the other node (unconfirmed) to its list of links;
313 sending to the subject node a ChangeLink message containing the address of other;
314 sending to the other node a ChangeLink message containing the address of subject.

Supposing however that at Step 301 it is determined that the receiving node has no space to add a link, or that at Step 302 it already has a link to the subject node, then the process examines whether the receiving node should add a link to its list of spare links. In Step 315 the process terminates if it is found that the subject node is already in the spares list. At 316 it is checked whether there is space to add a link to the spares list and if so this is duly added at 317. If not, then an existing one of the spare links is selected at random at 318, and removed at Step 319 so that it may be replaced by a link to subject at Step 317. Also, the variable notify level is decremented at 320 and if (Step 321) it remains nonzero the original Notify message—with this new value of notifylevel—is forwarded at Step 322 to the node (referenced as replace) pointed to by the randomly selected existing link.

The effect of this process is that when a node A that already has a full set of links receives a Notify message asking it to link to a subject node B, B's address is recorded as a spare link. This link remains dormant until A's list of spare links is full. Then, when A receives a later Notify message asking it to link to node C, and the spare link to node B is selected at Step 318, the new Notify message generated at Step 322 is in effect a request to node B to create a link from itself to node C.

A mechanism is also provided—but not shown on the flowchart—whereby when a link is unconfirmed and the receiving node does not receive confirmation (by way of a LinkAdded message as described below with reference to FIG. 6) within a give period of time, the unconfirmed link is deleted Note that when the receiving node has links that still have an "unconfirmed" status, it returns these unconfirmed links (as well as, of course, the confirmed ones) in response to LinksQuery messages, allowing other nodes to confirm that it is attempting to set up the link.

In FIG. 3, the "no" exits of Steps 305 and 309 lead to termination of the process: however if desired they could be routed to the "spare link" process commencing at Step 315, with a slight improvement in efficiency.

In Steps 309 to 314, the node effectively breaks one of subject's links and inserts itself in between. Another possible option, not shown in the flowchart, would be for the node to break one of its own links (assuming of course that it already has at least one link) and insert subject in between. This option, if implemented, would be tried immediately after the 'no' exit from Step 301. Firstly the receiving node would need to check whether subject had fewer than L−1 links, select at random one of its own links (to a node other), replace this with an unconfirmed link to subject, and send an AddLink messages to subject. In order to establish a bidirectional link between subject and other it would then (a) send to subject a special AddLink message requiring subject to add, unconditionally, other as an unconfirmed link to its list of links and (b) send to other a special ChangeLink message with the receiving node as the old link to be removed and naming subject as the new link to be added. This option could be included as well as, or instead of, Steps 309 to 314.

Another option for the receiving node to break one of its own links would be for it (having firstly verified that subject had fewer than L−1links) to send to subject a Notify message naming itself as subject. This would have the same outcome but involve a slightly larger messaging overhead.

Figure 4:
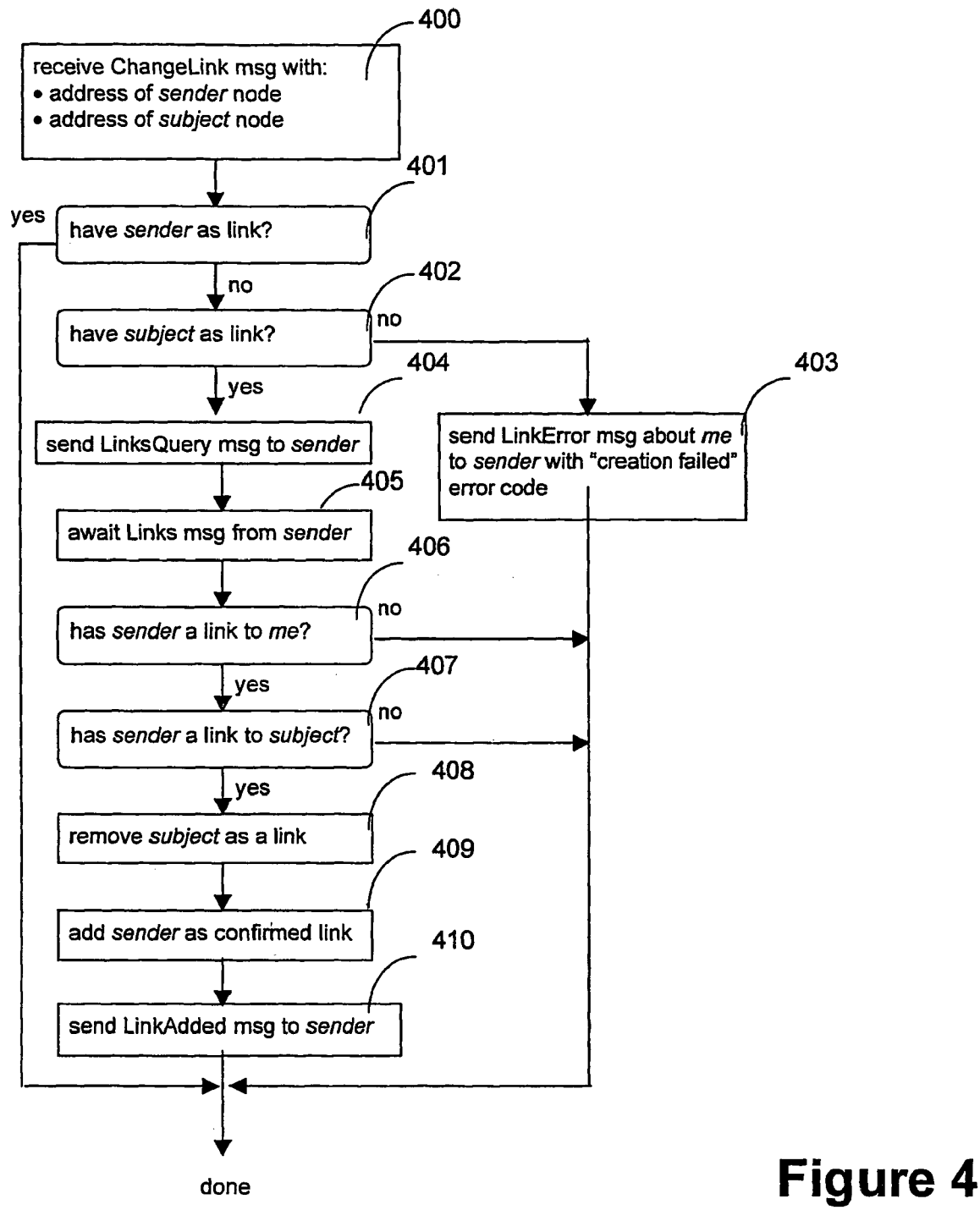

FIG. 4 shows how a node handles incoming ChangeLink messages. These messages are sent when a node X that received a Notify message wants to change an existing link into two new ones (see FIG. 2). The receiving node Y receives at 400 a Notify message with node Z as subject, i.e. asking node Y to replace its existing link to node Z with one to node X If it already has a link to X, it takes no further action (401), whilst if (402) it does not in fact possess a link to node Z it sends 403 an error message to the sender, X.

Assuming all is well, it sends (404) a LinksQuery message to the sender X and awaits (405) a Links message in reply from the sending node X to check that the latter has indeed created the two new links it should have created before changing the subject link. If these checks (406, 407) are successful, The receiving node removes its link to Z (408), adds X as a confirmed link (409) and returns a LinkAdded message to the sender X (410).

Figure 5:
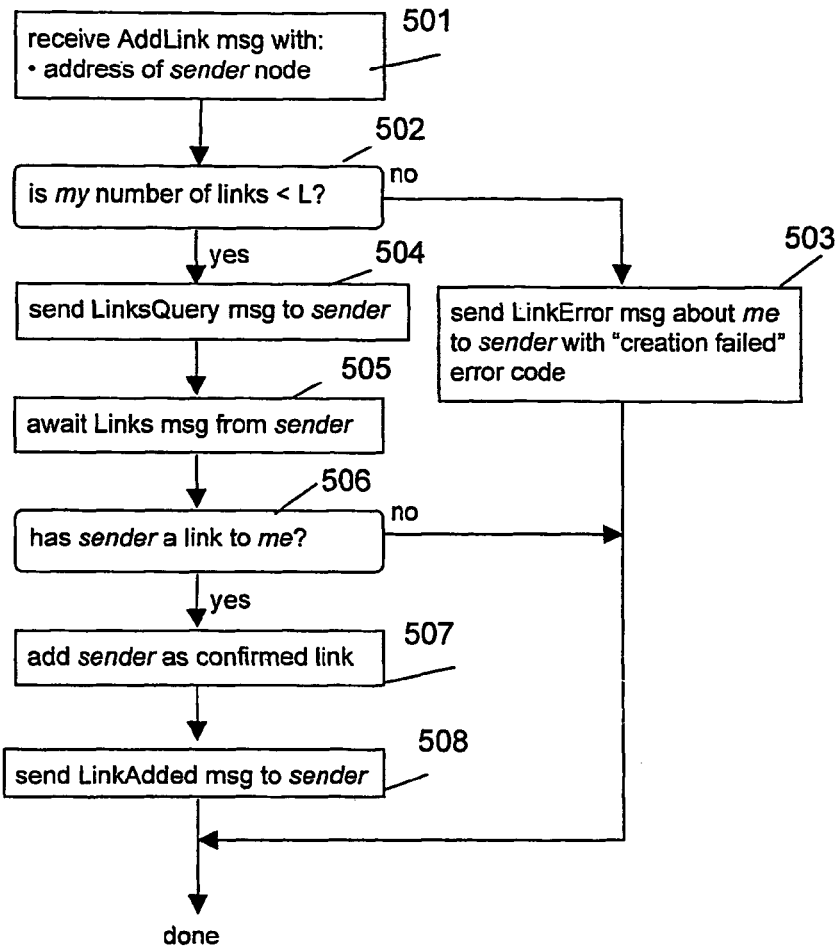

FIG. 5 shows how a node handles incoming AddLink messages. These messages are sent when a node wants to create a new link with a node (see FIG. 1). The message having been received at 501, the node checks at Step 502 whether it has space for another link and if not, returns an error message at 503. Otherwise, it sends (504) a LinksQuery message to the sender and awaits (505) a Links message in reply from the sending node, so that it may check at 506 that the latter has indeed created a links to the receiving node. If no, it declines to add the link and terminates, but if so it then adds sender as a confirmed link (507) and returns a LinkAdded message to the sender (508) by way of confirmation.

Figure 6:
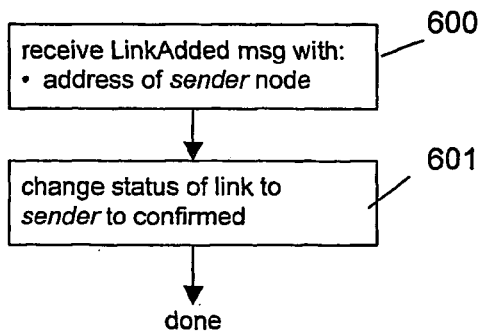

FIG. 6 shows how a node handles incoming LinkAdded messages. These messages are sent when another node has accepted a link to the receiving node, either in response to a ChangeLink or a AddLink message. When the LinkAdded message is received at 600 indicating that a link has been accepted, its status is changed to "confirmed" at Step 601. The link will then be maintained until either it is changed for a new link (in response to a ChangeLink message), or the link is broken.

Figure 7:
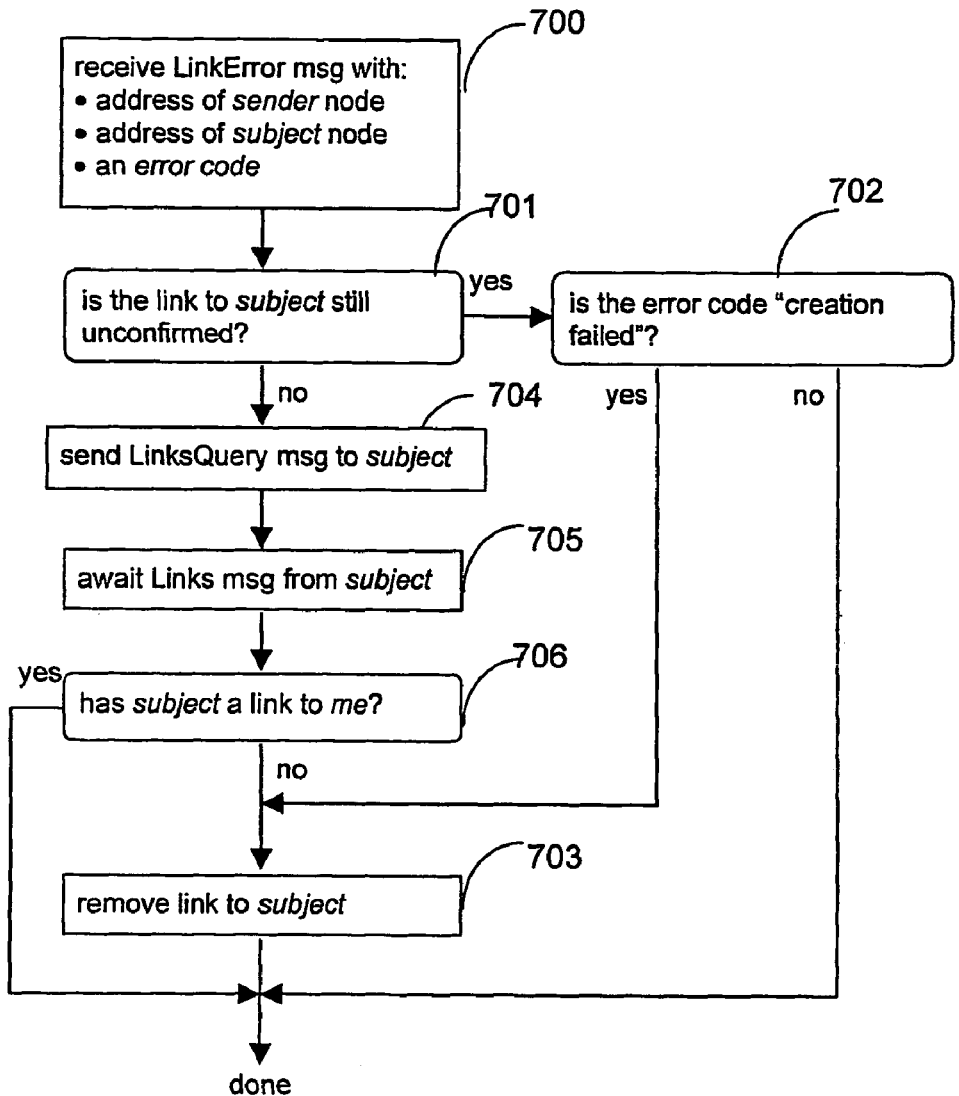

FIG. 7 shows how a node handles incoming LinkError messages. These messages are sent when either a node was unable to create a link to the receiving node after the latter requested a mutual link (by way of a ChangeLink or AddLink message), or a link appears to be broken (the node at the other end may not be responding to messages, or the link may not be mutual). Broken links are not detected by the self-organisation process, but when clients traverse the secondary network (as will be explained later).

Following receipt of the message at 700 it is determined (701) whether the message is about a node to which the receiving node has an unconfirmed link. If so, and (702) it carries an error code indicating failure to created a requested link, then the link is removed at 703. If however the message is not about a node to which the receiving node has an unconfirmed link, the receiving node sends (704) a LinksQuery message to the subject, awaits (705) a Links message in reply, checks the reply at 706 to check whether the subject has a link to itself, and if not then in Step 703 removes its link to the subject node.

Figure 8:
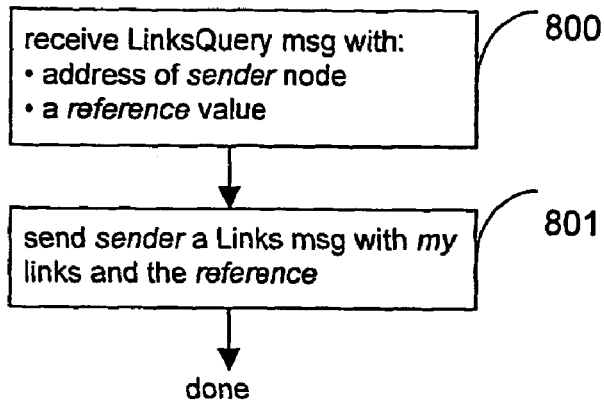

FIG. 8 shows how a node handles incoming LinksQuery messages. These messages are sent when another node wants to know the links of the receiving node, and the latter upon receipt thereof at 800 therefore responds at 801 with a Links message.

Figure 9:
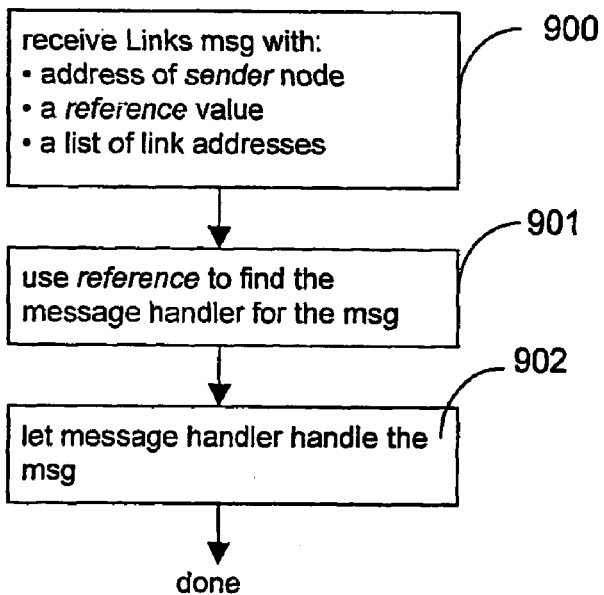

FIG. 9 shows how a node handles incoming Links messages. How it is handled depends entirely on why the corresponding LinksQuery message was sent. This happens for different reasons, as shown amongst others in FIG. 3, FIG. 4, FIG. 5 and FIG. 7. So what happens is that when a LinksQuery message is sent, it is given a reference that is locally unique and a message handler is associated with the reference. Then, when a Links message is received (900), the appropriate message handler is identified and the message is forwarded at Step 902 to the appropriate message handler so that the message it dealt with in the right way.

It may of course happen that no Links message is ever received in response to a LinksQuery, for instance because the receiving node has been shut down. Therefore, if after a given period no Links message has been received the corresponding message handler is removed. Although this has not been explicitly shown in any of the flow charts discussed here, it simply means that when a links query times out, no further action is taken and the entire flow chart is "done".

Retrieving Nodes

Given the address of a single node of the secondary network, it is possible to discover other, potentially all, nodes in the network. The way that this can be done is very simple. One sends to the known node a LinksQuery message to request all its links. The node replies with a Links message, containing the address of all the nodes it links to. One can then contact each of these nodes in turn, requesting their links and thus obtain the addresses of all their links. By continuing in this way, one traverses the network and gradually discovers all the nodes it contains.

Figure 10:
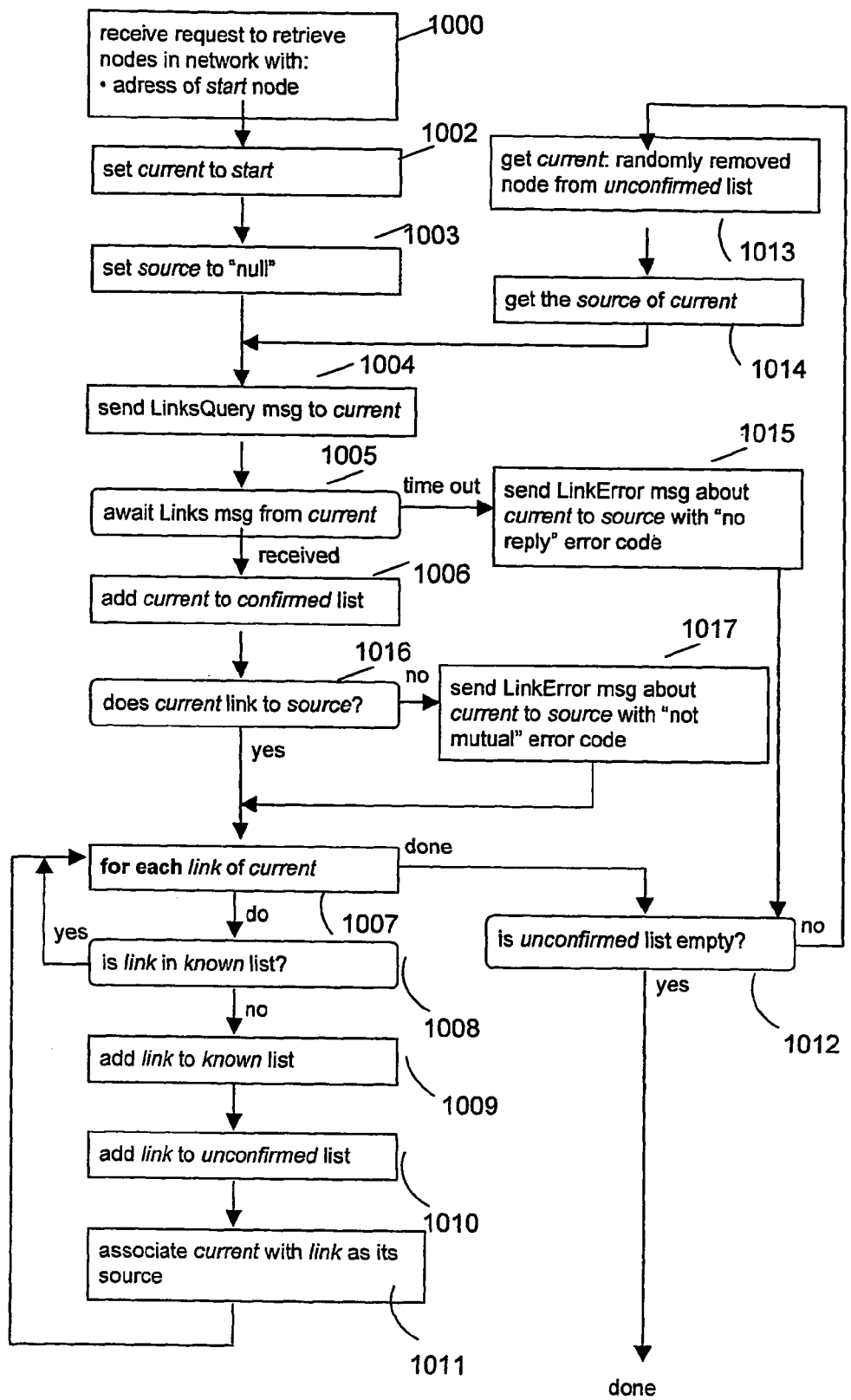

FIG. 10 shows the process in more detail. It will be understood that this is the process used in the retrieval step 35 shown in FIG. 1A. The addresses of all known nodes that have successfully been contacted are put in the "confirmed" list Data may be retrieved at the same time. In the case of the "web page comment" example, the relevant item of data is the address of the comment, and this too is entered into the confirmed list alongside the node address. The confirmed list then provides the addresses needed for the "Retrieve" comments step (36) in FIG. 1A. The "unconfirmed" list, on the other hand, contains the addresses of known nodes that have not yet been contacted. Finally, the "known" list contains the addresses of all known nodes. It includes all addresses in the "confirmed" and "unconfirmed" list, but also the addresses of nodes that have been contacted and that have not responded. The known list also has, for each address entered into it, an additional field for containing a source address—that is, the address of the node from whose list the address to which the current pointer points was obtained, for error reporting purposes.

It is not material where the retrieval process occurs: it may be at a node, or somewhere else. At Step 1000, a request to retrieve node addresses is received along with a start address, that is, the address of one node that had been determined to belong to the virtual network in question. In Step 1002, an address pointer, current, is initially set to this address whilst a second address pointer, source is initially null (1003).

At Steps 1004 and 1005 a LinksQuery message is sent to the address given by current, and a reply awaited. When a Links message is received, current is added to the confirmed list (Step 1006), with the comment address from the Links message alongside it At step 1007, a sub-process is entered, which is performed for each of the addresses contained in the Links message. If (1008) the address is already in the known list, the process steps on to the next address. Otherwise the address is added to the known list and to the unconfirmed list (Steps 1009, 1010). Also (1011), the address in current is entered into the known list as being the source of the address added.

Once this sub-process is complete, then (unless the unconfirmed list is empty, in which case the process terminates at Step 1012) at Step 1013 an address is selected at random from the unconfirmed list. This address becomes the new current address, and is deleted from the unconfirmed list. The next step (1014) is to look up current in the known list to retrieve the source address associated with it, and enter this in the source pointer. The random selection is not mandatory. E.g. current could be chosen to be the "oldest" node in the unconfirmed list, or the list could be sorted by another criterion (e.g. node's addresses) and current could always be the "first" node in this list. However, random choice of current has its advantages. It spreads the load in the system (in particular if not all nodes are always retrieved), and also spreads the testing of the links of the network so that broken links are discovered more quickly.

The process then continues again from Step 1004 and iterates until the unconfirmed list is empty—i.e. no further new addresses can be found.

A side effect of the retrieval process is that it discovers broken links. For instance, it may happen that a node is not responding, or that a link is not mutual. The latter is the case when a node A links to node B, but node B does not have node A in its link table. When a broken link is discovered, the node that is the "source" of the link is notified by way of a LinkError message. As FIG. 7 already showed, the source node can then check the link itself (to confirm the accuracy of the error report) and may remove the link as a result. A node that is not responding is recognised by the failure at Step 1005 to receive a Links message within a set time-out period and at Step 1015 an error message, containing the address of current and a "no reply" error code, is sent to source, whereupon control returns to Step 1012. The non-mutuality of a link is recognised by testing at Step 1016 to determine whether the Links message received for current contains the address of source: if not, an error message, containing the address of current and a "not mutual" error code, is sent (Step 1017) to source, but the retrieval process continues as before, as it is the responsibility of the source node to take remedial action (in accordance with the process of FIG. 7). The test at Step 1016 is skipped if source is null.

Note that even though multiple confirmed nodes may link to a node that does not respond to a Links message, only the node that first contributed the link (the source node) is notified that there was "no reply". This is partly because it makes the flowchart easier to understand. However, it can be argued that there is another, practical benefit. It may be a case that a node does not reply (in time) because it is temporarily overloaded. In this case, one may not want multiple nodes to simultaneously sent it a LinksQuery message to test if there is an error (as in FIG. 7). Either way, if desired, it is straightforward to update the node retrieval algorithm to notify all known nodes that are affected by a broken link, when such a link is discovered.

In FIG. 10 the node retrieval does not stop until all known nodes have been contacted. In practice, one may wish to terminate the process earlier. For instance, if a user is looking for a location from which to download a file, it may be sufficient to offer him or her the choice of ten potential download addresses instead of, say, all thousand.

The algorithm in FIG. 10 is shown as entirely serial. Only one node is contacted at a time. Another LinksQuery message is sent only after a reply has been received to the previous one (or it has been timed out). In practice, however we prefer to speed up the retrieval by issuing multiple LinksQuery messages in parallel. It may also be the case that at box 1000 multiple retrieval requests are simultaneously handled by multiple instances of the process of FIG. 10.

DISCUSSION

Successfulness of Self-Organisation

The aim of the secondary virtual network is to self-organise all nodes that should be grouped together into a single network, as opposed to several unconnected networks. Whether or not this is the case depends largely on how the initial Notify message is generated. For instance, if there is a group of twelve nodes that should all be grouped together, but of this group five nodes only receive notifications about other nodes in this group of five, and none of the other seven nodes are notified about any of these five nodes, it is impossible for the nodes to self-organise into a single network. Instead, they arrange into two separate networks, one of five nodes, and one of seven nodes. However, as long as the initial notifications are not such that it is impossible for nodes to self-organise into a single network, the self-organisation process is such that it is very unlikely that nodes do not self-organise into a single network. Calculation of the probability that the self-organisation results in a single network is complicated and depends on the mechanism by which the initial notifications are generated. However, in simulations we have experimented with several different initial notification mechanisms, and so far nodes never failed to self-organise into a single network.

Robustness to Malicious Nodes

So far it has been assumed that all nodes obey the protocol. However, it is possible that there are malicious nodes that do not play by the rules. They may try to break links maintained by other nodes and/or try to obtain too many links to themselves. It is desirable that the overall system is as robust as possible to such abuse.

The system described so far is already fairly robust to malicious nodes. That is because each node always check with a LinksQuery-Links message exchange the links maintained by the other relevant node before changing its own links. For instance, when a node receives an AddLink message (see FIG. 3), it first checks that the sending node has indeed linked to it, before adding the sender as its own link.

However, the system still has a relative weakness. As it stands, nodes can easily "lie" when they respond with a Links message. Often a node sends a LinksQuery message to check that the receiving node links to it. Knowing this, the receiving node can reply with a faked Links message modified such that it always contains the sender of the Links message as a link. This enables a node to have much more than the allowed number of L nodes linking to it. This would, consequently, reduce the overall number of "good" links in the system.

Fortunately, there is a way to address this weakness. This can be done if nodes sent their LinksQuery through a proxy node. These proxies are randomly chosen each time a node want to send a query. Each node can for instance use the nodes it currently links to as proxies. This way, the node (A) that wants to know the links of another node (B) is unknown to Node B, because the LinksQuery messages it receives is from a proxy node (C), and the message that Node B receives from Node C does not refer to Node A at all. Therefore there is no good way for Node B to send fake messages that have a significant effect on the overall system.

Of course, there's the question of what the effect is of malicious proxies. Although obviously malicious proxies have a detrimental effect (it is inevitable that nodes that do not obey the protocol affect the performance to some extend), this effect is limited. The reason is that they can only maliciously handle the LinksQuery that they are asked to forward, and these requests are spread roughly equally across all nodes. On the other hand, when proxies are not used, malicious nodes can cause havoc by being very active. If these nodes send many spurious AddLink messages, and fake the many Links message they subsequently send, the effect on the overall system is much larger.

Primary Virtual Network

The primary network is described in detail in our aforementioned international patent application. Here, the basic retrieval and self-organisation mechanisms will be described, along with a modification that enables the generation of Notify messages for driving the self-organisation of the secondary network.

Firstly it is necessary to explain the concept of virtual coordinate space used by this mechanism. It has already been mentioned that each node has a label. The label is translated into coordinates in a virtual space. The space can be one, two, or higher dimensional. The precise translation mechanism is not very critical: for a one-dimensional space the label, considered as a binary number, can be used directly as the coordinate. For two or more dimensions the preferred method is that the label, considered as a string of bits, is partitioned into two or more equal groups, each group, considered as a binary number, forming one of the coordinates. Each coordinate (or the coordinate, in a one-dimensional space) is scaled to lie in the range.

The distance between two labels in this virtual space is the Euclidean distance between the two coordinate sets (though other distances such as the city block distance (often called the Manhattan distance) could be used if desired. The coordinate space wraps, so that the distance in the x-direction between $x_1$ and $x_2$ is $$\mathrm{Min}\{(1-|x_1-x_2|), |x_1-x_2|\}$$

and the Euclidean distance in two dimensions between points $(x_1, y_1)$ and $(x_2, y_2)$ is therefore $$\sqrt{\{[\mathrm{Min}\{(1-|x_1-x_2|),|x_1-x_2|\}]^2 + [\mathrm{Min}\{(1-|y_1-y_2|),|y_1-y_2|\}]^2\}}.$$

We also recall at this point that each node has a list 22 (FIG. 1) with a number of entries representing links to other nodes. Each entry consists of the label and address of such another node. Initially this list is empty and therefore the node has a second, similar, list of bootstrap links—that is, a few links (typically four) so that it is initially able to contact other nodes of the network. As well as the links in the list 22 (referred to as short-range links), the node may also have additional such lists arranged hierarchically, and/or a list of long-range links. These are described in our earlier international patent application, but, as they are optional, are not described here.

Messages

Figure 11:
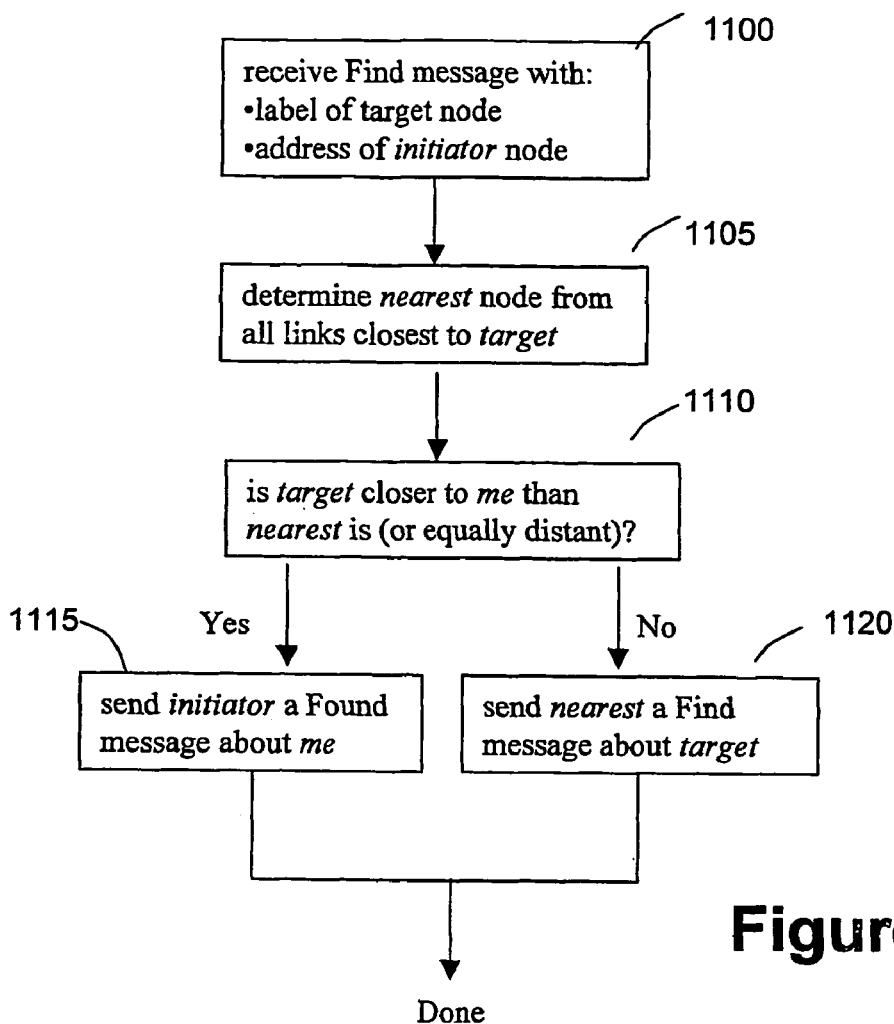
FIGS. 11 to 14 and 16 are flowcharts showing aspects of the operation of a node of the primary virtual network.

Firstly, the following messages are used (note that the messages used in the primary virtual network are different from, and completely independent of, the messages used in the secondary virtual network):

FIND messages are used to initiate and fulfil node look-ups and to support "PULL" updates. They contain:
  the label of a target node
  the address of the node that initiated the query FOUND messages are used to return the results of queries. They contain:
  the label of the target node
  the label of the node that was found
  the address of the node that was found
  the address of the node of the secondary network that is associated with the node that was found
  application-specific data—in this case the address of the comment node that is associated with the node that was found PUSH messages advertise a node's label to other nodes. They contain:
  the label of a subject node
  the address of the subject node
  the number of hops to go to reach a target node NOTIFY messages are used to propagate push-updates. They contain:
  the label of a subject node
  the address of the subject node Retrieval FIG. 11 shows how each node handles incoming Find messages. In principle, the receiving node looks for a node which is closer than itself to the target node identified in the Find message and, if successful, passes on the Find message. If not successful, it returns its own address and label. It does this by carrying out the following steps:

Step 1100: the node receives a Find message which contains the label of a target node and the address of an initiating node;

Step 1105: the node translates the label of the target node into co-ordinates in label space and calculates which, of all the links (nodes) it has recorded is closest to the target node in label space. The relevant node is designated nearest node;

Step 1110: the node compares the distance between its own co-ordinates and those of the target node with the distance between the co-ordinates of nearest node and those of the target node;

Step 1115: if the distance between its own co-ordinates and those of the target node is less (or equal), the node sends to the initiating node, via the network 10, a Found message containing its own label and address;

Step 1120: if the distance between the co-ordinates of nearest node and those of the target node is less, the node forwards the Find message to nearest node.

Figure 12:
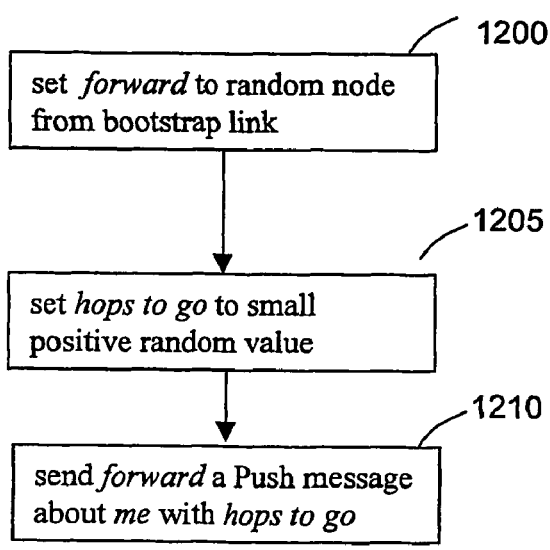
Figure 13:
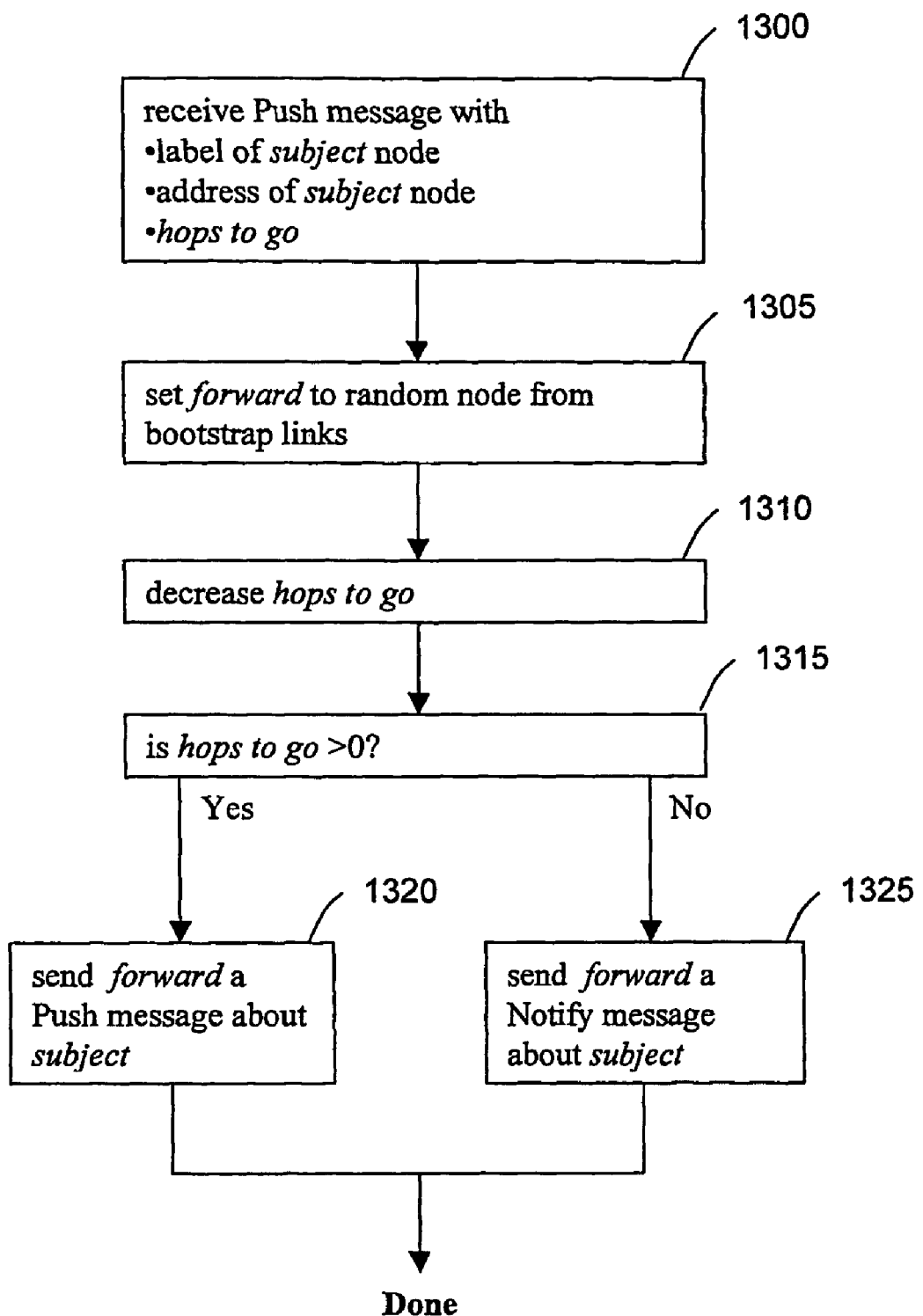
Figure 14:
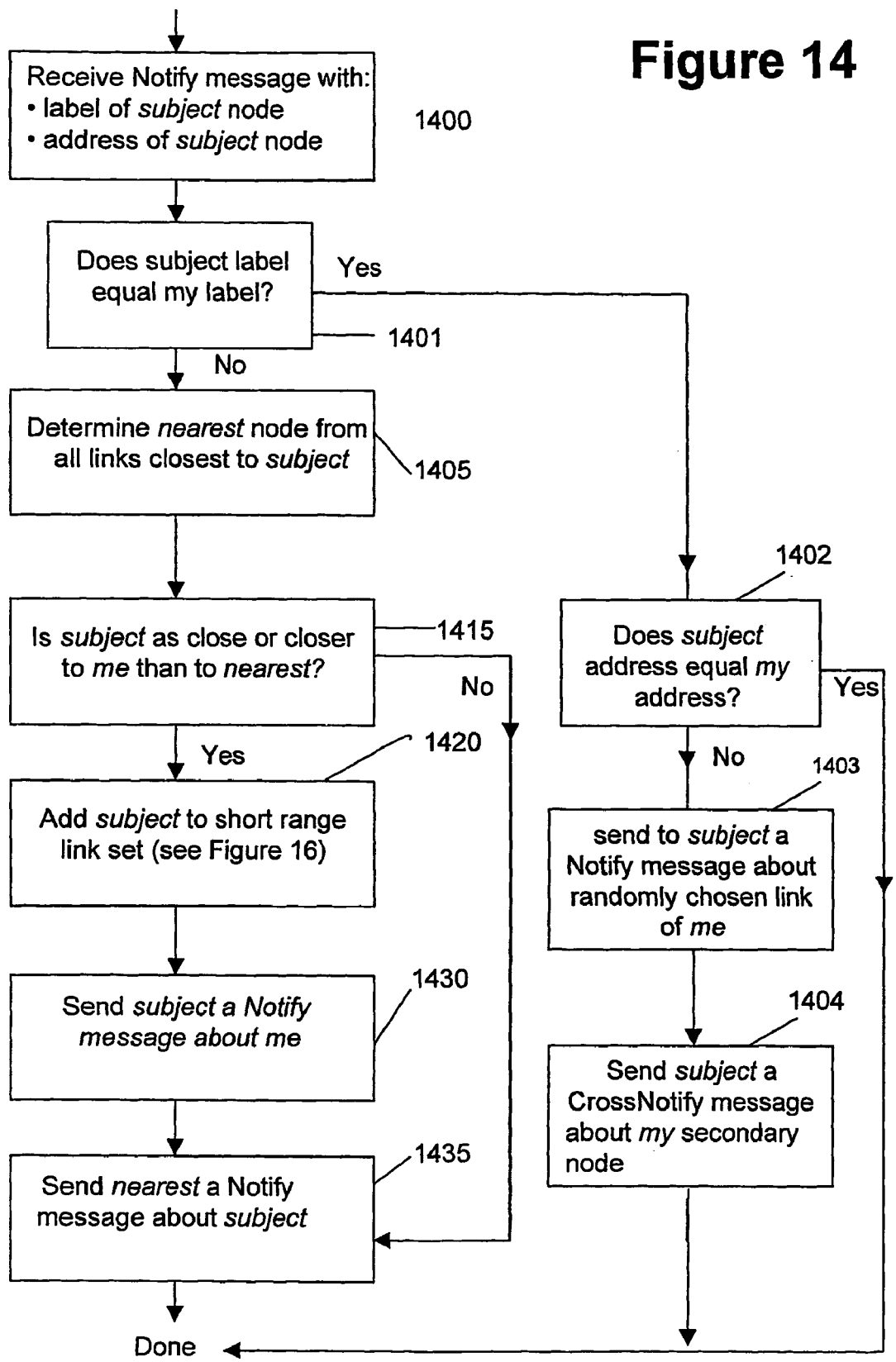

The address of the node returned in Step 1115 is either that of one with the target label, or one close to it in label space. When the returned label does not match the target label, it may mean either that the target node does not exist or that the virtual network is not sufficiently self-organised Push Each node spontaneously initiates Push updates. For instance, each node might start a Push update process periodically. In a Push update, a node sends out a Push message with its own label and address through a random series of nodes, setting a limit on the length of the series. The last node in the series sends a Notify message back towards the initiating node. FIGS. 12, 13 and 14 show the various parts of this process.

FIG. 12 shows how a node initiates a Push update, using the following steps:

Step 1200: the node selects a link randomly from amongst its bootstrap links and enters the address of the node identified by the selected link as a forward address for a next message;

Step 1205: the node enters a small positive random number for the field hops to go in the Push message;

Step 1210: the node enters its own label and address as those of the subject node in the Push message and sends the Push message to the node at the forward address, using the network 10.

FIGS. 13 and 14 show how short range links are updated. Push messages are used together with Notify messages to update short range links. There are two phases in this updating. In a first phase, each node randomly forwards the Push message until the value in hops to go in the message as received is "0". If the value in hops to go is "0", the receiving node will start the second phase of the Push update by sending a Notify message. In the second phase, the Notify message is successively forwarded to nodes whose labels are progressively closer to the subject node's in the virtual space. If no node with a closer label can be found, then if necessary the links for the last found node are updated. This is always the case when it would otherwise be unable to find the given subject node, for instance because it had no short range links yet established. The last found node then also sends additional Notify messages to nodes that could potentially improve their link sets as well.

Referring to FIG. 13, the first phase of a Push update, dealing with incoming Push messages, involves the following steps:

Step 1300: a node receives a Push message. The Push message will contain the label and address of an initiating node as the subject node and will have a value in the field hops to go;

Step 1305: the receiving node selects a link randomly from amongst its bootstrap links and enters the address of the node identified by the selected link as a forward address for a next message;

Steps 1310 and 1315: the receiving node decreases the value in the field hops to go by 1 and checks whether the decreased value for hops to go is still greater than zero;

Step 1320: if the decreased value is still greater than zero, the node forwards the Push message to the forward address which it has entered;

Step 1325: if the value is zero, the node instead enters the label and address of the initiating node (given in the received Push message) as the subject node in a Notify message and sends the Notify message to the forward address which it has entered.

Referring to FIG. 14, the second phase of dealing with Push updates, dealing with Notify messages, involves the following steps:

Step 1400: a node receives a Notify message containing the label and address of a node as the subject node;

Step 1401: the receiving node checks whether the subject of the Notify message has the same label as the receiving node;

Step 1402: if so, the receiving node checks whether the subject of the Notify message has the same address as the receiving node. In that case it takes no further action;

If however the subject of the Notify message is a node with the same label as, but an address different from, the receiving node, then two events occur. Firstly (Step 1403) the receiving node sends to the subject node of the incoming Notify message a Notify message naming as subject a randomly-chosen node from the receiving node's own list of short-range links. Secondly, Step 1404 causes the generation of a Notify message for action by the secondary network. However, the receiving node cannot generate such a message directly. In general we prefer to avoid sending, over the communication network, messages between different virtual networks, but the main problem is that the receiving node would need not only the address of its own node of the secondary network, but also the address of the node of the secondary node that is associated with the subject node. The receiving node does not have this address. Therefore, a two-stage process is used.

First, the receiving node sends a special CrossNotify message to the node of the primary network specified as the subject in the incoming Notify message. This message contains:
- a sender address, set to the address of the receiving node (i.e. the node that received the incoming (primary network) message);
- a receiver (or destination) address, set to the address contained in the incoming Notify message;
- a subject address, set to the address of the node of the secondary network associated with the receiving node.

Note that the first two addresses are the addresses of nodes on the primary network and the third address is the address of a node on the secondary network.

Secondly, the node of the primary network that receives the CrossNotify message, in effect, forwards it to the associated node of the secondary network. If necessary, the forwarding node could reformat the message into the format in use on the secondary network and replace the (primary network) receiver address with the address of the associated node of the secondary network. The message would then be handled just as shown in FIG. 3. The reason that we say "in effect" is that, in practice we prefer that the node of the primary network that receives the CrossNotify message just sends, to its associated node of the secondary network, a simple, local message containing the address specified in the subject field of the CrossNotify message. In that case the process of FIG. 3 would be modified to include the step of setting notifylevel to a suitable value.

Figure 15:
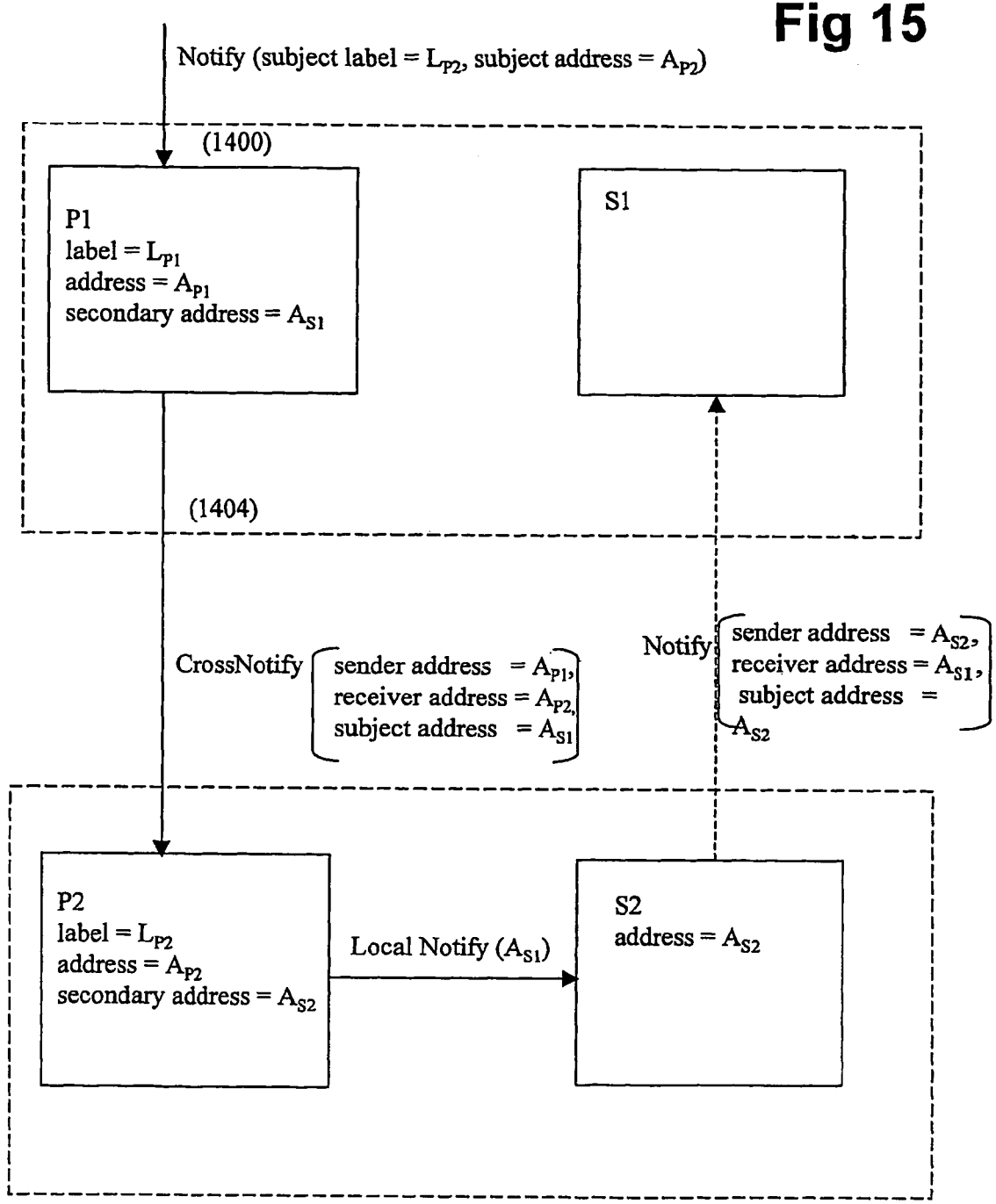
FIG. 15 is a schematic diagram illustrating the flow of messages during the process depicted in FIG. 14.

This process will be illustrated by means of an example, with reference to FIG. 15 where the boxes represent nodes and arrows represent messages. Suppose a node P1 of the primary network receives, in step 1400 of FIG. 14, a Notify message containing the label $L_{P2}$ and address $A_{p2}$ of the node p2 of the primary network as subject. At the node P1 it is recognised (Steps 1401, 1402 in FIG. 14) that the subject node has the same label as P1 (i.e. $L_{P1}=L_{P2}$) but a different address ($A_{P1} \neq A_{P2}$). The node P1 knows the address $A_{S1}$ of its secondary network node S1, and generates (at Step 1404 in FIG. 14) a CrossNotify message with sender address $A_{P1}$, receiver address $A_{P2}$ and subject address $A_{S1}$. This message is received at node P2 of the primary network and this sends a local notify message, with the address $A_{S1}$, to the associated node S2 of the secondary network. Alternatively, the node S2 of the secondary network, upon receipt of the LocalNotify message, could, instead of creating the link itself according to the process of FIG. 3, generate a further Notify message (of the secondary network) (shown by the dotted line in FIG. 12) which it sends to the node S1, naming itself as subject. The Notify message is then processed at node S1 which then uses the process of FIG. 3. This option involves an additional message but has the advantage that, when the process of FIG. 3 comes to be executed, the Notify message has actually been sent by the node whose address is in the subject field of the message, and the subject node has thus inherently been confirmed as still being in existence.

Returning now to FIG. 14: Step 1405: the receiving node translates the label of the subject node into co-ordinates and calculates which of the short range links it has recorded leads to a node label whose co-ordinates are closest to those of the subject node in virtual space. The relevant node is designated nearest node;

Step 1415: the receiving node compares the distance between its own co-ordinates and the co-ordinates for the subject node with the distance between the co-ordinates for the nearest node and the coordinates for the subject node.

If, at Step 1415, the distance between the receiving node and the subject node is found to be the same or less, the receiving node adds the label and address of the subject node as a link in its own short range link set ((step 1420): this process is further discussed below with reference to FIG. 16), sends to the subject node a Notify message which contains the label and address of the receiving node (step 1430) and sends to the nearest node a Notify message which contains the label and address of the subject node (Step 1435);

If, at Step 1415, the distance between the nearest node and the subject node is found to be greater, the receiving node reverts to Step 1435 in that it sends to the nearest node a Notify message which contains the label and address of the subject node.

Figure 16:
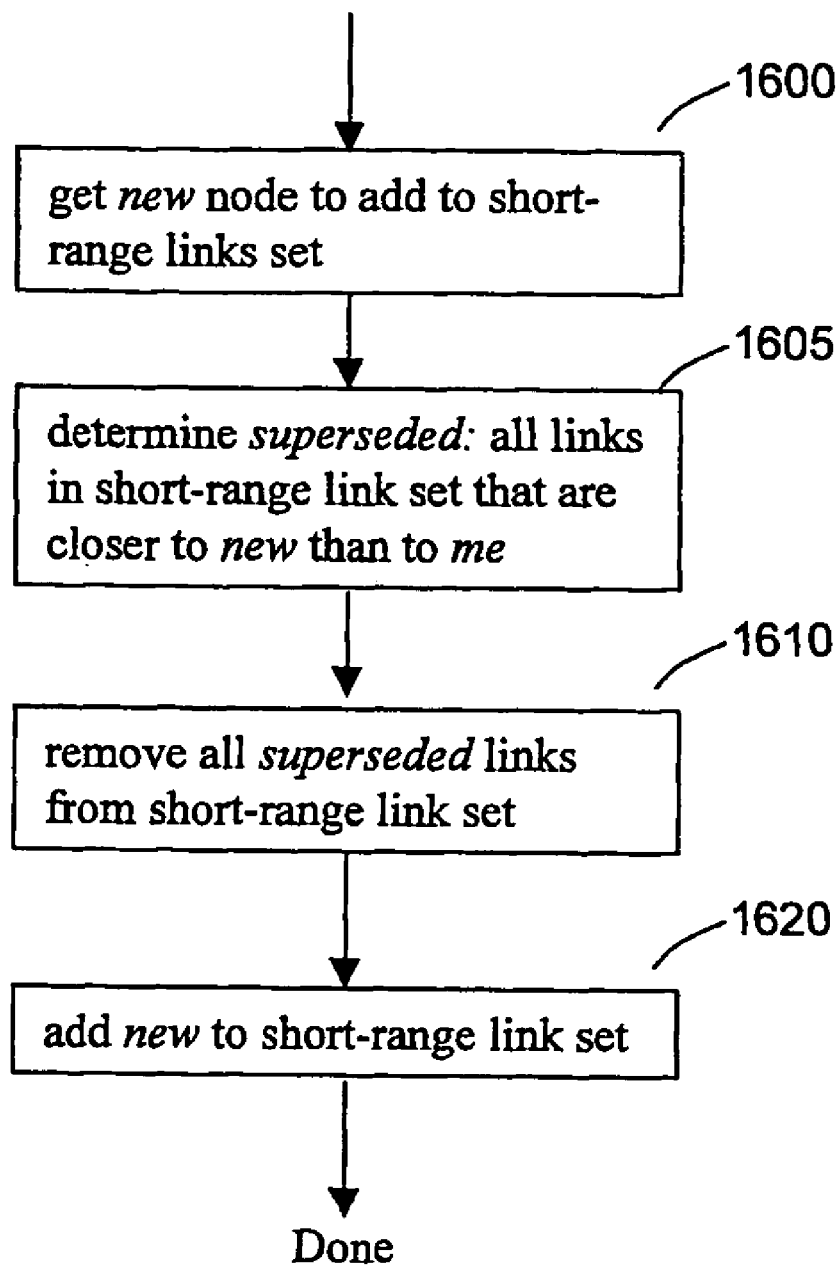

FIG. 16 shows in detail how a node behaves when it updates its short-range links. It adds the new link to its short-range links and removes all short-range links that are superseded by this link.

Referring to FIG. 16, a node may need to add a new link to its list of short range links, for instance as a result of Step 1420 in FIG. 14.

Step 1600: the updating node (that is, a node which is carrying out an update to its short range link set) has the label and address of a node for a new link;

Step 1605: the updating node identifies all existing links which are in respect of nodes which are closer to the new node than to the updating node. These identified links are to be superseded. To identify these links, the updating node calculates, for each existing link, the distances between the co-ordinates for the new node and the co-ordinates for the nodes specified in its existing links. It compares each of these distances with the distance between its own co-ordinates and the co-ordinates for the node specified in the respective existing link;

Step 1610: all links where the distance in relation to the new node is less than the distance in relation to the updating node are removed from the short range links;

Step 1620: the updating node adds a link for the new node to its short range links.

What is claimed is:

1. A method of operating a virtual network having a plurality of computer processor nodes linked to each other for electronic communication by a list of node addresses, in which each node has a memory storing a list for storing only up to a predetermined number of addresses of other such nodes, said method comprising:

(i) using a computer processor at a first said node of said network to receive an electronic message requesting a link between said first node and a second node of said network;

(ii) using at least one computer processor to determine whether both the first node and second node has, in each case, a number of addresses in its list which is less than the predetermined number;

(iii) in the event that this condition is satisfied, using at least one computer processor to insert the address of the first node into the list of the second node and the address of the second node into the list of the first node;

(iv) in the event that this condition is not satisfied, using at least one computer processor to determine whether the first node has a number of addresses in its list which is at least two less than the predetermined number, and if so
  (a) to select from the list of the second node the address of a third node of said network;
  (b) to remove the address of the third node from the list of the second node;
  (c) to remove the address of the second node from the list of the third node;
  (d) to insert the address of the second node into the list of the first node and inserting the address of the third node into the list of the first node; and
  (e) to insert the address of the first node into the list of the second node and inserting the address of the first node into the list of the third node.

2. A method according to claim 1 in which the message requesting a link is received at the first node and in which, in step (iii):
  the address of the second node is inserted into the list of the first node accompanied by a marker indicating that it is unconfirmed;
  a message is sent from the first node to the second node requesting the second node to add the address of the first node to the links of the second node;
  at the second node the address is so added and an message of confirmation is sent to the first node; and
  at the first node upon receipt of the message of acknowledgement the "unconfirmed" marker is removed.

3. A method according to claim 2 in which a node, upon receipt of a message requesting that it add to its list the address of a specified node, firstly sends a message to the specified node requesting a copy of the list of the specified node, and then complies with said add request only if it receives from the specified node a list which contains the address of the node receiving the request.

4. A method according to claim 1 in which the message requesting a link is received at the first node and in which
  the first node sends to the second node a request for a copy of the list of the second node;
  the second node sends the requested copy to the first node;
  step (iv) (a) of selecting from the list the address of a third node is performed at the first node; and
  steps (iv) (a) and (b) are performed in that:
  the first node adds the address of the second node and the address of the third node to the list of the first node, in each case accompanied by a marker indicating that it is unconfirmed;
  the first node sends to the second node a message requesting that it remove from its list the address of the third node and replace it with the address of the first node;
  the first node sends to the third node a message requesting that it remove from its list the address of the second node and replace it with the address of the first node;
  the second node upon receipt of such message removes from its list the address of the third node, replaces it with the address of the first node and sends a message of confirmation to the first node;
  the third node upon receipt of such message removes from its list the address of the second node, replaces it with the address of the first node and sends a message of confirmation to the first node;
  the first node upon receipt of the message of confirmation from the second or third node removes the respective "unconfirmed" marker from its list.

5. A method according to claim 4 in which a node, upon receipt of a message requesting that it remove from its list the address of another node and replace it with the address of a specified node, firstly sends a message to the specified node requesting a copy of the list of the specified node, and then complies with said request only if it receives from the specified node a list which contains the address of the node receiving the request.

6. A method according to claim 3 in which the list request message to the specified node, and a reply to such message, are sent via an intermediate node in such a manner that the address of the node sending the list request message is not communicated to the specified node.

7. A method according to claim 1 in which each node also has means for storing at least one spare link, and including:
  in the event of receipt of a message requesting a link between a first node and a second node when the first node has a number of addresses in its list equal to the predetermined number, inserting the address of the second node into said spare link storage; and
  upon receipt of a later message requesting a link between the first node and another node, forwarding that message to an address retrieved from the spare link storage means of the first node.

8. A virtual network having a plurality of nodes, each node having storage means containing a list for storing up to a predetermined number of addresses of other such nodes and processing means, said processing means being arranged, in operation to perform the method of claim 1.

9. A first node of a virtual network, said first node comprising:
  a memory configured to contain a list for storing only up to a predetermined number of addresses of other such nodes of said network; and
  a programmed processor configured to perform the following operations:
  receive messages;
  respond to messages requesting information about the contents of the list;
  comply with received requests to remove an address from the list;
  comply with message requesting insertion of an address into the list; and
  in response to receipt of a message requesting a link between the node and a second node:
  (A) generate a message to the second node requesting information about the contents of its list;
  (B) determine whether both the first node and second node has in each case a number of addresses in its list which is less than the predetermined number;
  (C) in the event that this condition is satisfied, insert into its list the address of the second node and generate a message to the second node requesting the second node to add to its list the address of the first node;

(D) in the event that this condition is not satisfied, determine whether the first node has a number of addresses in its list which is at least two less than the predetermined number, and if so
  (a) select from the list of the second node the address of a third node;
  (b) insert the address of the second node into the list of the first node and insert the address of the third node into the list of the first node;
  (c) generate a message to the second node requesting the removal of the address of the third node from the list of the second node and insertion of the address of the first node; and
  (d) generate a message to the third node requesting the removal of the address of the second node from the list of the third node and insertion of the address of the first node.

\* \* \* \* \*